United States Patent

Hansen et al.

[11] Patent Number: 5,773,909
[45] Date of Patent: Jun. 30, 1998

[54] X-RAY TUBE TARGET DRIVE ROTOR

[75] Inventors: Steven D. Hansen, Port Washington; James A. Blake, Franklin, both of Wis.

[73] Assignee: General Electric Company, Milwaukee, Wis.

[21] Appl. No.: 730,778

[22] Filed: Oct. 16, 1996

Related U.S. Application Data

[63] Continuation of Ser. No. 366,178, Dec. 29, 1994, abandoned.

[51] Int. Cl.$^6$ .................................................. H02K 19/00
[52] U.S. Cl. ...................... 310/261; 310/262; 310/166; 310/171
[58] Field of Search ..................................... 310/166, 156, 310/261, 267, 168, 171, 152, 262, 45, 44, 182, 183

[56] References Cited

U.S. PATENT DOCUMENTS

| | | | |
|---|---|---|---|
| 2,492,678 | 12/1949 | Amtsberg | 172/120 |
| 3,909,647 | 9/1975 | Peterson | 310/44 |
| 4,651,040 | 3/1987 | Gerstner et al. | 310/166 |
| 4,781,286 | 11/1988 | Weaver | 198/789 |
| 4,939,399 | 7/1990 | Oh et al. | 310/198 |
| 5,260,983 | 11/1993 | Ono et al. | 378/133 |

*Primary Examiner*—Steven L. Stephan
*Assistant Examiner*—B. Mullins
*Attorney, Agent, or Firm*—James J. Lichiello; John H. Pilarski

[57] ABSTRACT

An induction motor rotor particularly for x-ray tube applications comprises a series of hollow cylinders fitting concentrically on each other and on a motor shaft. The first cylinder is a highly heat resistant and electrically insulating material. The next cylinder is a highly magnetic material cylinder fitting on the first cylinder. The next and outermost cylinder is an electrically conductive material providing the armature conductor of the induction motor rotor.

3 Claims, 1 Drawing Sheet

X-RAY TUBE TARGET DRIVE ROTOR

This application is a continuation application of application Ser. No. 08/366/178 filed Dec. 19, 1994 now abandoned.

BACKGROUND OF THE INVENTION

This invention relates to an X-ray tube rotating target electric motor drive rotor and more particularly to an improved electric induction motor rotor in an X-ray tube on which a target anode disc is mounted for rotation.

Ordinarily an X-ray beam generating device, referred to as an X-ray tube, comprises spaced dual electrodes of an electric circuit in an evacuated chamber or tube. One of the electrodes is a thermionic emitter cathode electrode which is mounted in the tube in spaced apart relationship to a target or anode electrode. Electrical resistance heating of the cathode generates a stream of electrons directed towards the anode target. The electron stream is appropriately focussed as a thin beam of very high velocity electrons striking the target. A striking surface of a predetermined material (usually comprising a refractory metal) is formed on the target so that the kinetic energy of the striking electrons against the target material is converted into electromagnetic waves of very high frequency, i.e. X-rays, which project from the target to be appropriately collimated for penetration into an object for interior analysis or examination purposes, for example, a human medical diagnostic procedure. The high velocity beam of electrons striking the target surface generates extremely high and localized temperatures deleterious to the target material and structure. As a consequence it has become a practice to utilize a rotating disk-like target. By means of a rotating target, the electron striking region of the target is continuously changing to avoid localized heat concentration and better distribute the heating effects throughout the target structure. Target rotational speeds in excess of 10,000 RPM are not unusual.

One example of drive means employed to rotate an X-ray tube target anode comprises mounting an electric induction motor armature or rotor for coaxial rotation in a necked down section of an evacuated glass X-ray tube. Electric motor field windings closely and coaxially surround the necked down section of the tube to act on the concentric rotor in accordance with well known electric motor principles to cause rotation of the rotor. The target disc is coaxially mounted on an extended rotor shaft to be exposed to the thermionic emitter cathode.

Increases in X-ray generating capabilities with resultant larger X-ray tubes and larger targets has lead to the need for a more effective electric motor drive to provide increased starting and running torque for the target.

Accordingly, it is an object of this invention to provide an improved, high torque, electric induction motor rotor for electric motor drive means of rotating targets in X-ray tubes.

SUMMARY OF THE INVENTION

An induction motor rotor structure comprises a rotor shaft having a concentric thick sleeved electrical insulator thereon followed by a concentric magnetic material sleeve on the insulator sleeve. A further concentric sleeve of an electrically conductive material is fitted on the magnetic sleeve to complete a high torque armature assembly with increased resistance to high voltage breakdown.

This invention will be better understood when taken in connection with the following drawings and description.

DESCRIPTION OF A PREFERRED EMBODIMENTS

Figure 1:
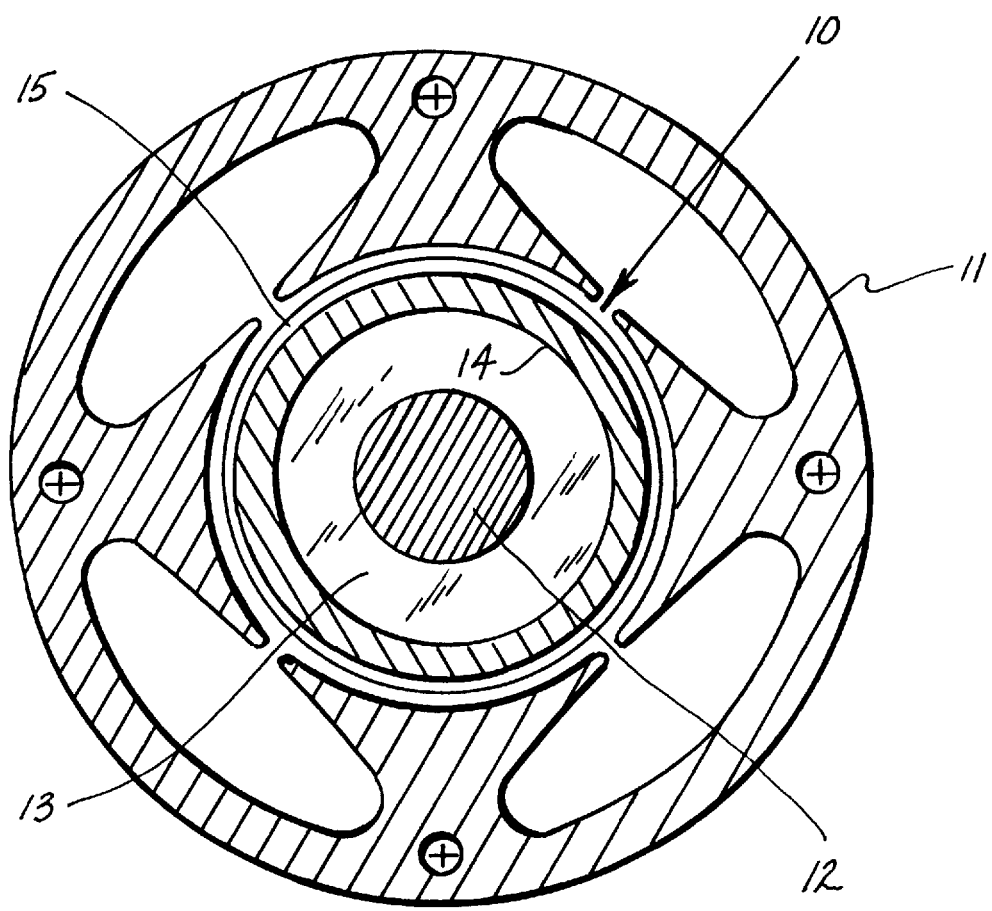
FIG. 1 is a schematic cross-sectional view of the rotor of this invention in its stator environment.

Referring now to FIG. 1, the improved rotor structure 10 of this invention is illustrated in its usual concentric relationship to a surrounding or encircling motor stator structure 11, for example, a four pole motor stator with appropriate stator windings (not shown). Rotor structure 10 in its basic form comprises a series of radial sections of predetermined electric rotor materials arranged in a predetermined order between a rotor shaft and the encircling motor stator. Rotor structure 10 includes, in this example, a rotor shaft 12 on which the described series of sections of electric motor materials is provided. A first cylindrical section 13 comprising an electrically insulating material is closely concentrically fitted on shaft 12. Cylinder 13 is preferably formed of a highly electrical insulating material of high temperature resistant characteristics such as a ceramic or glass material. Temperatures in cylinder 13 may approach about 500° C. A second section comprising a thinner wall cylinder 14 of a good magnetic material is concentrically fitted on cylinder 13. Cylinder 14 material may comprise iron, Fe, or metal alloys of similar good magnetic characteristics. A third rotor section comprises an outermost thin wall cylinder 15 of a good electrically conductive material such as copper, Cu, and alloys thereof. Alternatively, in some instances, conductive cylinder 15 may be a metal coating on cylinder 14 as the rotor electrical conductor for an induction motor rotor. At this point, the electrical materials assembly for rotor 10 is complete.

A major problem associated with X-ray tube rotor assemblies is their need to withstand the extremely high electrical voltage present during X-ray tube operation. For example, a rotating large anode is usually fixed to shaft 12 to be rotated therewith while being impacted by a thin beam of very high velocity electrons. Because of various design and engineering criteria, shaft 12 is usually formed from steel stock material. As a consequence, rotor 10 may be at a very high electrical potential corresponding to that of the rotating target anode, for example, about 90 KV, while the stator 11 is at ground potential. Any insulation breakdown and corresponding high voltage discharge causes deleterious X-ray tube and rotor operation. Typically, in X-ray tube applications, the high voltages noted are controlled by having a very large space between the outermost electrically conductive cylinder such as cylinder 15 of FIG. 1 and the adjacent stator periphery. However, while an increased or large rotor stator spacing is successful in preventing high voltage breakdown, it significantly reduces motor efficiency to such a low level that the available rotor acceleration becomes inadequate for larger and higher speed target anodes. Efficiency is reduced because of the substantial space between the magnetic material stator and the corresponding magnetic material in the rotor such as cylinder 14. Present rotor construction for X-ray tube applications represents a compromise between (a) reducing rotor stator space for higher torque, but with a reduction in high voltage breakdown resistance, and (b) increased rotor stator spacing to withstand high voltage breakdown but with a reduction in torque generation. However, within the structural space limitations available in improved x-ray tubes and the noted design factors (a) and (b) above, there is a need for higher torque rotors with high electrical breakdown resistance. By means of the rotor construction of FIG. 1, rotor components are more effectively utilized in such a manner that the above noted (a) and (b) compromise features are separated and can be individually accommodated. For example, a very high voltage electrically insulating thick wall cylinder 13 fills the space between and engages shaft 12 and magnetic cylinder 14 for improved electrical insulation of shaft 12 from magnetic material cylinder 14 and rotor conductor cylinder 15 while at the same time locating magnetic cylinder 14 in closer operative relationship to the magnetic material stator 11 for increased torque. A further torque advantage is gained by using a large radius electrically conducting and shorting cylinder 15. Additionally rotor magnetic material cylinder 14 and electrically conductive cylinder 15, are brought closer to stator 11 at ground potential, an arrangement in which there is a tendency for the rotor not to develop a maximum high voltage potential.

This invention provides an improved X-ray tube induction motor rotor in which the rotor magnetic material and rotor electrical conductor are located at the extreme periphery of the rotor and closely adjacent to the induction motor stator pole pieces with highly effective insulation which not only insulates the magnetic and conductive material components from the rotor shaft but also locates these components close to the stator pole pieces to provide increased rotor torque. In the induction motor stator, plural pole pieces with arcuate faces, as illustrated in FIG. 1, define a concentric circular aperture in which a cylindrical shaft mounted armature concentrically resides. In the armature, the armature magnetic material and the armature electrical conductor are supported at the periphery of the rotor where they will be closely adjacent to the stator pole pieces for maximum torque. At the same time these periphery components are electrically insulated from the armature shaft by a hollow thick wall insulating material cylinder 13 on the shaft 12 between and engaging the magnetic material cylinder 14 and shaft 12. An important component of the rotor of this invention is the hollow thick wall cylinder 13 of a high dielectric constant, high dielectric strength material, such as various ceramic and glass compositions. Additionally, cylinder 13 also has good structural integrity and high temperature resistance and is employed as both a solid structural and electrically insulating rotor component which fills the space between shaft 12 and magnetic cylinder 14 without need for other structures and materials which may not have the combined mechanical and electrical properties for this space, particularly properties which electrically isolate shaft 12 and serve as an effective barrier to current leakage and the described high voltage breakdown. The rotor components as described are conveniently formed in circular bands, sleeves, or cylinders concentrically positioned on each other and on shaft 12 in a concentric interfitting relationship assembly. While each of the rotor cylinders are ordinarily discrete and independent components, the outermost electrical conductor may be a deposited copper coating or a layer bonded to the next adjacent magnetic material cylinder 14. In the interfitting assembly as described, the component bands, sleeves or cylinders may be in engagement or close contact with each other as illustrated. The materials and their assembly are effective to withstand quick acceleration and torque transfer for larger target anodes while retaining their electrical and magnetic characteristics under difficult operating conditions of x-ray tubes.

While this invention has been disclosed and described with respect to a preferred embodiment, it will be understood by those skilled in the art that various changes and modifications may be made without departing from the spirit and scope of the invention.

What is claimed:

1. In an x-ray tube induction motor having plural stator pole pieces with arcuate faces which define a central aperture, an improved high torque shaft mounted cylindrical rotor assembly fitting concentrically in said aperture for concentric rotation therein, said rotor comprising in combination, (a) a separate discrete and self-supporting thick wall electrically insulating cylinder on said shaft to electrically insulate said shaft from said rotor assembly where said shaft may be exposed to an electrical potential of about 90.0 KV with said stator being at around potential and with said electrical insulator exposed to a temperature of about 500° C., (b) a thinner wall iron, Fe, cylinder fitting concentrically on said thick wall insulating cylinder to be positioned thereby in closely adjacent operating relationship to said stator pole pieces for maximum torque, (c) a thin wall good electrically conductive copper Cu, cylinder fitted on said iron. Fe cylinder to serve as the electrical conductor for said induction motor rotor.

2. The invention as recited in claim 1 wherein said thick wall electrically insulating cylinder comprises a high dielectric constant high dielectric strength ceramic material of good structural integrity and high temperature resistance and filling the space between said shaft and said iron cylinder.

3. The invention as recited in claim 1 wherein said cylinders are positioned on each other in a concentric interfitting relationship.

* * * * *